(12) United States Patent
Hay

(10) Patent No.: US 6,827,081 B2
(45) Date of Patent: Dec. 7, 2004

(54) PROCESS AND APPARATUS FOR MODULATING TEMPERATURES IN THERMAL STORAGE

(75) Inventor: Harold R. Hay, Los Angeles, CA (US)

(73) Assignee: H.R. & E.J. Hay Charitable Trust, Los Angeles, CA (US)

(*) Notice: Subject to any disclaimer, the term of this patent is extended or adjusted under 35 U.S.C. 154(b) by 0 days.

(21) Appl. No.: 10/670,286

(22) Filed: Sep. 26, 2003

(65) Prior Publication Data

US 2004/0123862 A1 Jul. 1, 2004

Related U.S. Application Data

(60) Provisional application No. 60/415,098, filed on Oct. 2, 2002.

(51) Int. Cl.[7] ............................................... E04D 13/18
(52) U.S. Cl. ........................ 126/621; 126/701; 126/702; 165/48.2
(58) Field of Search ................................ 126/621, 628, 126/629, 634, 639, 640, 643, 910, 701, 702; 165/45, 48.1, 48.2, 49

(56) References Cited

U.S. PATENT DOCUMENTS

| | | |
|---|---|---|
| 3,299,589 A | 1/1967 | Hay |
| 3,314,862 A | 4/1967 | Hay |
| 3,450,192 A | 6/1969 | Hay |
| 3,563,305 A | 2/1971 | Hay |
| 3,994,278 A | 11/1976 | Pittinger |
| 4,198,953 A * | 4/1980 | Power ........................ 126/617 |

* cited by examiner

Primary Examiner—Jiping Lu
(74) Attorney, Agent, or Firm—Clark & Brody

(57) ABSTRACT

A process and apparatus for modulating the temperature of an enclosure includes a thermal storage means on a roof portion, and panels positioned above the thermal storage means. One panel is fixed in position, either over the thermal storage means or adjacent thereto. A pair of movable panels are arranged at different levels from the fixed panel and are adapted to move with respect to sides of the fixed panel to cover or expose the thermal storage means for solar heating during the day or cooling at night.

14 Claims, 3 Drawing Sheets

PROCESS AND APPARATUS FOR MODULATING TEMPERATURES IN THERMAL STORAGE

This application claims priority based on provisional patent application No. 60/415,098 filed on Oct. 2, 2002.

BACKGROUND ART

This application discloses improvements on my previous U.S. Pat. Nos. 3,299,589; 3,314,862; 3,450,192; and 3,563,305 that dealt with "modulating temperatures within enclosures."

The enclosures of prior art were primarily of a modest size such a residence or the usually smaller size of solar stills. These were preferably fitted with movable panels of insulation appropriately operated in consonance with the diurnal availability of solar energy to heat a thermal storage material and an underlying enclosure, or to cool the storage material and enclosure to the night sky. The storage material used was principally water though other materials with high heat capacity were disclosed by this inventor such as concrete, earth, brick, and metal.

This prior art attained maximum collection of solar radiation and maximum loss of heat by radiation to the night sky throughout a localized body of heat storage material by totally exposing this for heat gain or loss through stacking the insulation over a portion of said enclosure not to be thermally controlled. Success with a modest size enclosure having a modest internal heat load frequently resulted in a much greater thermal efficiency than was required to maintain the enclosure temperatures within the desired thermal range. This excess thermal effect was eliminated by unidirectional movement of the insulation panels from said enclosure portion not to be thermally controlled to a location totally or partly over the thermal storage means.

The process for modulating temperatures in enclosures A and B of FIG. 1 by a major embodiment of prior art consists, in the wintertime, of moving the panels to expose water 4 to solar radiation which, in most part, passes through the water to the black liner 7. There, it converts to heat conducted to the steel ceiling 8 and underlying enclosures as well as to the overlying water of which the depth has adequate heat storage capacity to keep said enclosures at desired temperatures over a period of several cloudy days. A solid-state control mechanism (not shown) measures the indoor temperature, the water temperature, and the SolAir (solar radiation plus wind cooling) temperature and activates the motor 10 to close the panels if the water becomes overheated.

While not previously conceived by this inventor, nor known to have been used by others in prior practice, the panel 1 can be opened only a small distance to uncover a small portion of 4 as a means to regulate the amount of admitted solar radiation. Water 4 then has nonuniform heat that tends, in time, to equalize under a covered portion of the water by means of conduction and convection within the water and by conductance through the steel deck, 8. This was not earlier considered because it was simple to open all of the panels to obtain maximum heat and have them close totally when the total underlying enclosure reached the desired temperature. The method of partial opening requires less motor power and produces zone control of temperatures that, in some instances, is highly desirable in the underlying enclosures.

In the summertime, with prior art, it is generally desired to keep the water 4 totally covered during the daytime until the solar radiation intensity is low and, by water exposure, heat can be lost to the sky. This cools the water and, through the steel deck, cools the underlying enclosure. Again, prior practice has been to obtain maximum cooling quickly by uncovering all of the water rather than exposing only a smaller portion to deliberately create and maintain two or more thermal zones in the water and in underlying portions of the enclosure.

During Spring and Fall months, the temperatures within the water 4 may remain within a desired range without moving the overlying panels of insulation.

Many experimenters with high academic or professional qualifications have attempted to improve upon my early art of the 1960s. Their several experiments and publications varied the means and location for storage of the movable insulation panels above a portion of the enclosure not to be thermally controlled through ways foreseen by me but not used because of associated disadvantages that caused system failure.

For instance, in an attempt to circumvent my simple horizontal stacking of the insulation panels, other investigators moved the panels from a horizontal position over the thermal storage media to a vertical accordion pattern not over the storage media. This configuration had been foreseen in my earliest work in the 1960s and warnings were given at Arizona State University that, while this position might have the advantage of reflecting additional amounts of solar energy onto the thermal storage mass, it resulted in a highly objectionable windfoil effect on the stacked panels. Also it did not hold the panels totally within the track system thereby subjecting them to unequally restrained wind uplift with consequent disturbing chatter as well as damage requiring intolerable maintenance problems. Moreover, the reflection of solar energy to the water was not necessary when more heating and cooling than required was obtained without it.

SUMMARY OF THE INVENTION

It is an object of the present invention to gain economic and thermal control advantages in the process of modulating temperatures by significant simplifications of the prior art, as seen in FIGS. 3, 4, and 7, and their description.

It is a further object to have, above the roof of a building, an apparatus that consists of a thermal control means comprised primarily of a drive mechanism and three separate panels, or assemblies of panels, with the central panel being rigid and in a fixed position highest above a thermal storage means located over said roof and two movable insulating panels in separate tracks located at different levels under and to either side of said fixed panel wherein said movable panels totally cover said thermal storage means on both sides of said fixed panel or substantially underlie it and thereby expose, on both sides of said fixed panel, portions of said heat storage medium for solar energy collection or radiation of heat to the night sky, as seen in FIGS. 3, 4, and 7, and their description.

It is an added object to have a process and apparatus wherein movable insulation causes a thermal storage means to receive solar heat or reject heat to the Sky wherein heat in said storage means is transferred internally between areas shaded and not shaded portions through convection and conduction from two sides of said shaded portion, as seen in FIGS. 3, 4, and 7, and their description.

It is an additional object to have an apparatus and process to modulate the temperature of an enclosure through its roof to an overlying fluid thermal storage medium having overhead a thermal control means in which some component insulation panels are moved to effect heat transfer between the sky and a portion of said fluid thermal storage mass while a fixed panel shades another portion of said storage medium wherein heat is transferred within said thermal storage mass by convection and conduction from two sides, as seen in FIGS. 3, 4, and 7 and their description.

Moreover, it is an object to have a process and apparatus that can transfer heat from within a structure through its top into that portion of an overlying fluid thermal storage medium, shaded at least in part by a fixed portion of a thermal control means, where it enhances bilateral conduction and convection that transfers heat to another area of said medium that can be exposed by movable insulation panels to control solar energy collection and heat rejection in said heat storage medium, as seen in FIGS. 4 and 7.

6. It is also an objective to CO-laterally assemble on the roof of an enclosure of large size, such as a commercial building, an array of individual thermal control units, each having a central fixed top panel and a drive mechanism for two or more underlying panels of movable insulation, in which said fixed panels are located for easy access or to distribute the shading effect thereof in the optimum manner for heat transfer through a thermal storage means to establish thermal zone control in an underlying enclosure, as seen in FIG. 6 and its description.

It is a further object of this invention to have a process and apparatus to produce thermal conditions within an enclosure that are nearly constant under its entire roof area in contrast to prior art which required large stacking areas not covered by a thermal storage means, as seen in FIG. 7 and its description.

It is also an object to produce temperature control of different zones in a building by a process and apparatus that partially uses forced air circulation to transfer heat from one zone, where the temperature is controlled by conduction from an overlying thermal storage media having above it movable insulation as a thermal control means, to a remote zone not having said overhead thermal storage and movable insulation thermal control means, as seen in FIG. 5, and its description.

It is an object of this invention to reduce the track cost, maintenance and sounds of a thermal control means having movable insulation panels, as seen in FIGS. 2 and 3 and their description.

Another object of this invention is creation of various thermal zones within an enclosure to favor temperature-sensitive animal or plant growth, as seen in FIG. 6 and its description.

Still another object of my invention lies in a process and apparatus that uses thermal storage means of different shapes and orientation, and corresponding movable insulation thermal control means, for areas of small size or odd shape such as might be caused by other equipment commonly occupying a portion of a roof structure such as an atrium, skylight, dormer, auxiliary air conditioning, etc, as seen in FIG. 6 and its description.

Also it is an object to provide a process and apparatus for thermal control of an enclosure wherein a portion of the apparatus is one or more fixed panels spanning a substantial portion of a roof to serve as an independently standing base on which to mount such items as solar stills, water heaters, TV antennae, photovoltaic cells, telephone and electric wires, lightning rods, and other items, as seen in FIG. 7 and its description.

Another object of this invention, is an apparatus over an enclosure comprising a freestanding fixed panel that bears, fastened thereon, such devices as solar stills, water heaters, etc., and which is also the fixed panel under which movable panels of a thermal control means converge over a thermal storage material which modulates temperatures in said enclosure, as seen in FIG. 7 and its description.

BRIEF DESCRIPTION OF THE DRAWINGS

In FIGS. 1 through 7 it is understood that like numbers indicate similar parts consisting of similar materials and functions and which parts generally are of the same nature and use as corresponding parts (not numbers) disclosed in my prior patents.

DESCRIPTION OF THE INVENTION

Figure 1:
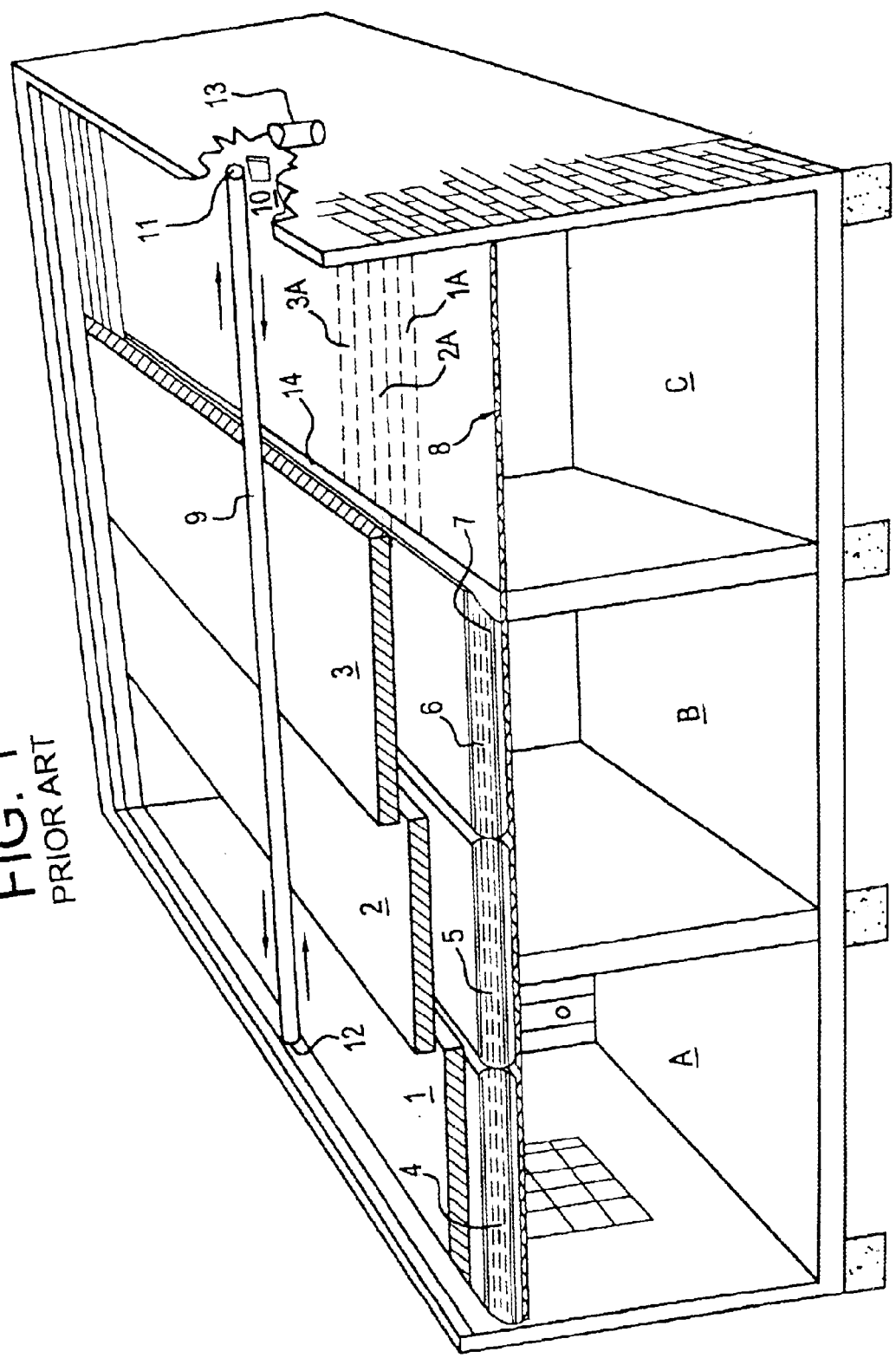
FIG. 1 is a front cutaway perspective view of a building structure in which a prior art is demonstrated.

My prior art, as applied to a flat roof enclosure, is here shown as the apparatus FIG. 1 in which movable rigid panels 1, 2, and 3, preferably of insulation with framing of steel (not shown) and fitted at ends with wheels or portions of edge runners (not shown), are over an air space above a thermal storage medium shown here as water 4, 5, and 6 enclosed in a 6-mil thick, transparent, polyethylene plastic bag formulated to include an ultraviolet inhibitor. This thermal storage medium, if fluid, is also referred to herein as a Thermopond or referred to as storage media whether a fluid or a rigid high heat capacity material such as metal or concrete. It lies on an imperious liner such as a sheet of 4-mil or thicker, black, carbon-filled, plastic 7 or other suitable, impervious, relatively non-insulating material extending across a high heat conductivity roof deck, preferably of steel 8, over portions A and B of an enclosure and capable of being extended over or through a pony dam 14 to cover C a portion of the enclosure not to be thermally controlled but used in this prior art as a panel stacking location. The liner serves to prevent rain or water spillage from penetrating to said preferably galvanized steel roofdeck 8.

The enclosure comprising portions A, B, and C may have walls of wood or other conventional material such as the herein illustrated high-heat-capacity concrete block with windows, doors, floors, and supporting foundations all of conventional construction. A and B are comparable rooms in which the internal temperature is to be similarly modulated by overlying Thermoponds while C, not underlying Thermoponds, is not thermally affected thereby except remotely by indirect, normal conduction through B the wall in common.

Above portions of the enclosures A and B of FIG. 1, are Thermoponds 4, 5, and 6 confined within the parapet and an upward extension of the wall between B and C or a pony wall of wood 14. Over the three compartments of the enclosure are movable panels 1, 2, and 3 generally of rigid insulation framed in steel channel members (not shown) at opposite ends to which are attached wheels or edge runners (not shown) that move in steel (or other material such a plastic) channel tracks firmly attached to an upward extending parapet, or other rigid structure above the enclosure, so as to permit a drive mechanism to easily move said panels from positions over the Thermoponds to positions 1a, 2a, and 3a in horizontal stacking over enclosure C. Said drive mechanism is here illustrated as a system composed of a woven steel wire or rope 9 passing around a pulley fastened to the parpet at 12 and to an opposing parapet or vertical structural member on C and fastened to the framing of 1 at 12 and, over C, around a capstan 11 actuated by a gear-reduced motor 10 seen in a breakaway section of a wall of the enclosure.

In my prior process for modulating temperatures within the enclosure, the thermal control panels are either positioned over the Thermoponds or stacked horizontally over C in consonance with the diurnal movement of the sun, or otherwise, to control the temperatures in the Thermoponds and thereby in the underlying enclosures.

Figure 2:
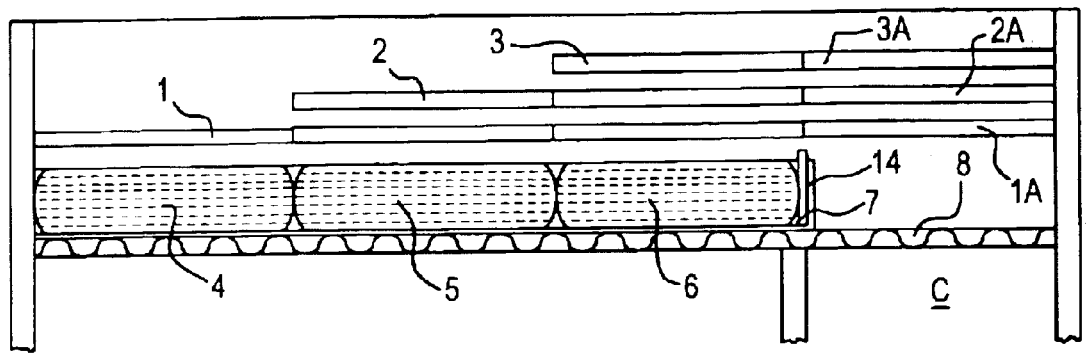
FIG. 2 is a sectional view through a portion of a building structure that shows the location and extent to which tracks for movable insulation are needed in prior art.

FIG. 2 shows the prior art location and extent of the movable panel track assembly attached to a parapet at one end of the ends of the panels and the enclosure in order to move panels from positions 1, 2, and 3 to 1a, 2a and 3a.

The prior art apparatus produced markedly unequal thermal zone control within an underlying enclosure as a result of moving a thermal control means unidirectional in a manner covering or uncovering all or a portion of underlying thermal storage media. In this present invention, the process obtains better temperature modulation within an underlying enclosure by use of a drive mechanism that causes simultaneous, bi-directional movement of portions of a thermal control means at different levels.

Figure 3:
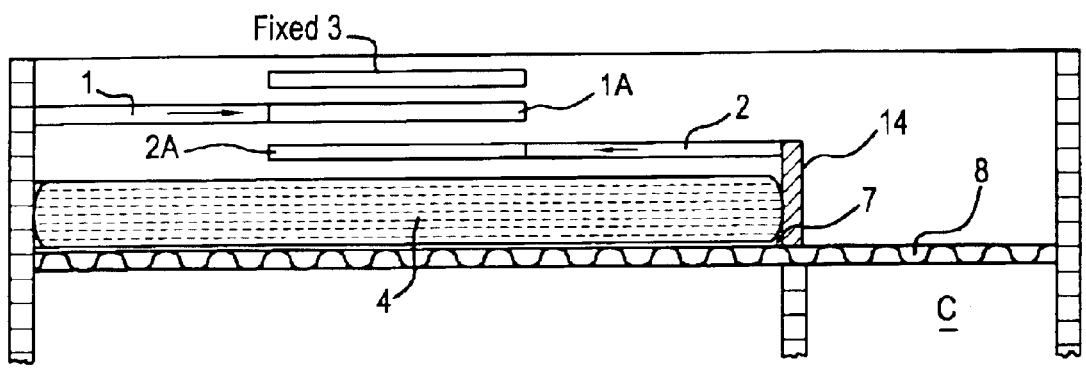
FIG. 3 is a sectional view through a portion of a building structure, in scale with FIG. 1, that shows the lesser amount of track required to converge two panels of insulation under a central, overhead, fixed panel.

A preferred embodiment of my invention is the apparatus shown in FIG. 3 in which a fixed thermal control panel 3, over a Thermopond (fluid), is in a central position with no track or drive requirement but attached, by means of conventional fastenings or welding, to a rigid portion of the enclosure's parapet, or other supporting means, and a foreground rigid beam (not shown) comprising part of the roof-supporting structure. Movable panels 2 and 1, juxtaposed as compared to FIG. 1, are shown on separate tracks in positions covering a Thermopond likewise juxtaposed in the direction of movement of panels 2 and 1. The juxtapositions indicate the flexibility of positioning the Thermopond and the direction of panel movement at different levels the alternative movements being activated by the drive mechanism.

Indicated in FIG. 3 are the tracks required to position panels 2 and 1 under 3 in its fixed position. These tracks are drawn to the same scale as those in prior art shown in FIG. 2 and thereby demonstrate this invention's need for a far smaller length of track, a much lower cost of construction and maintenance, less power for movement of the insulation, and less possibility of sound from moving panels in the tracks. As indicated here, the reduction of track for panel movement is in the ratio of nine to four.

Although this embodiment of the new invention reduces the area of collection of solar energy or dissipation of heat from the Thermoponds as a result of the fixed panel coverage, this loss is far less than would be expected from Thermoponds losing one-third coverage. Unlike prior art, no portion of the enclosure, such as C, is required for stacking panels at positions not covered by a Thermopond.

With prior art, the practice was to totally withdraw the thermal barrier means from over the thermal storage means. When this effort to obtain maximum exposure of the storage means for the collection of solar energy, or for the dissipation of heat, did exceed the needs, the insulation panels were then positioned totally over the storage means.

Though not known as having been published nor practiced with prior art, it is possible to limit the movement of a panel such as 1 of FIG. 1 and FIG. 2 so as to expose, over 4, a small portion of the water for energy collection or heat dissipation. With this partly opened position, one obtains a modest degree of lateral heat conduction and convection within the Thermopond albeit not with the highest degree of horizontal uniformity. With the present invention movable panels 1 and 2 can expose all or portions of the water on both sides of said fixed panel to collect solar energy collection or to radiate heat to the night sky and thus better promote horizontal equalization of temperatures within said heat storage fluid.

Figure 4:
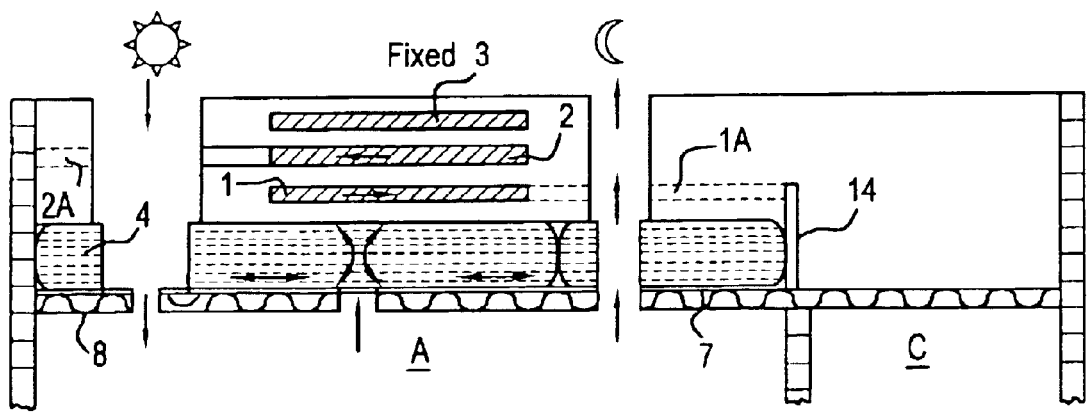
FIG. 4 is a diagrammatic sectional view of a roof structure underlying a thermal storage means with an overlying thermal control mechanism and, superimposed, a representation with various arrows indicating directions of heat flow of solar energy collection and heat dissipation to the night sky as well as directions of fluid conduction and convection within a thermal storage means.

FIG. 4 shows the three panels of the thermal control means in their central stacked position over a Thermopond fully covering the underlying enclosure A. Here, illustrated by superimposed broad arrows, the total available daytime energy from the sun is shown to lose a little of its power to moisture in the air and a small portion by absorption of the ultraviolet wavelength in the exposed, transparent, plastic enclosing the Thermopond. More is absorbed in the enclosed water 4 and again some is absorbed in the bottom layer of the plastic tubing enclosing the Thermopond. The majority of the energy reaches the black liner where, in both prior and presently preferred art, it converts to heat that is transferred to the underlying enclosure by conduction through a steel roof deck 8 in addition to lateral transfer into the Thermopond where it sets up conduction and convection effects, illustrated by arrows, which act favorably to equalize temperatures and to prevent heat stratification.

The temperatures in various parts of 4 are also equalized by heat transfer from within the enclosure to the overlying portion of thermal storage means that underlies the fixed panel.

Figure 5:
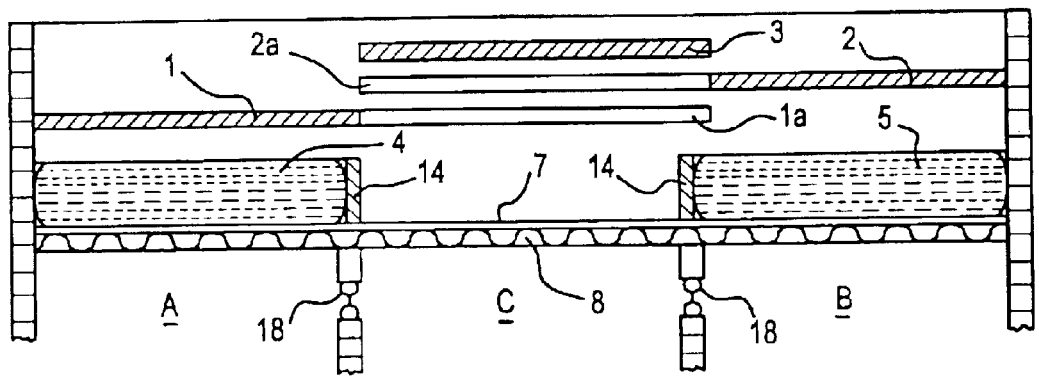
FIG. 5 is a sectional view of an apparatus that comprises a thermal control means over different portions of a structure requiring separate temperature zone control.

Now described in relation to FIG. 5 is the apparatus for a process that produces separate zone control of temperatures within underlying portions A, B, and C of an enclosure. Above the roof 8 and liner 7 covering the enclosure, portions A and B have overlying Thermoponds that materially affect the temperatures therein whereas C has none because of separation maintained by an upward extension of walls or by a pony dam 14. A suitable drive, not shown but of the type in FIG. 1, is provided to move panels 1 and 2, which preferably are formed primarily of rigid insulation that may be framed in steel channels to provide stiffening to help withstand wind uplift, in tracks from a position over Thermoponds 4 and 5 to central positions 1a and 2a under fixed panel 3 constructed of a suitable material that at all times shades the roof portion over C. When panels 1 and 2 are so stacked. Thermoponds 4 and 5 either receive solar energy or reject heat to a colder sky and thereby produce temperatures in the water that are favorable for conduction through the enclosure roof 8 to produce desired temperatures in A and B.

Because C has no Thermoponds over its roof 8, it will have a temperature determined primarily by the shading of panel 3 and infiltration through air in common with that over the Thermoponds and conduction through such structural components as the pony wall 14, said roof 8, and walls of A or B in common with it. When the temperature produced thereby in C is not optimum, it may be further modulated by conventional use of a motorized fan 18 regulated to force air of different temperature from within A or B into C, or the reverse, to obtain the desired zone temperature therein. By separately timing, or differently limiting, the extent of opening panels 1 and 2, different degrees of heat gain or loss are produced in the underlying Thermoponds 4 and 5 which will create different temperatures in A and B and in the underlying portions of the enclosure to establish zone control of temperatures within A and B.

Thus established are various embodiments of my apparatus and my processes that can provide zone control of separate portions of an enclosure. Lest it be thought that these are unwieldy ways to obtain zone control, it is recalled that conventional air conditioning requires extensive equipment, controls, and energy consumption to distribute air noisily in different volumes through ducts to rooms presenting different heat loads. Then air conditioning creates very unequal temperatures at different distances from the duct outlets within the rooms. In contrast, my invention creates, with much lower equipment and energy costs, a more desirable, relatively uniform, temperature control from thermal transfer through the wide overlying ceilings of rooms.

Often it is unnecessary to have thermal zone control as precise as that sought with conventional refrigerant air conditioners. For example, within an enclosure for chicken raising, the temperature should be higher and very uniform where young chicks are hatching. This temperature in the enclosure should decrease when the chickens feather out and tolerate a lower temperature. With the novel thermal control means herein describe, separate temperature zones in all or in sections of an underlying enclosure may be obtained by one or a combination of embodiments of this invention.

Similarly with plant growth my invention provides, within a partitioned enclosure, different, controlled temperature zones in one of which temperatures tend to force seed germination and growth while those in others favor slowing plant growth and conserving an optimum quality of growth, such as blooms, for specific occasions.

Figure 6:
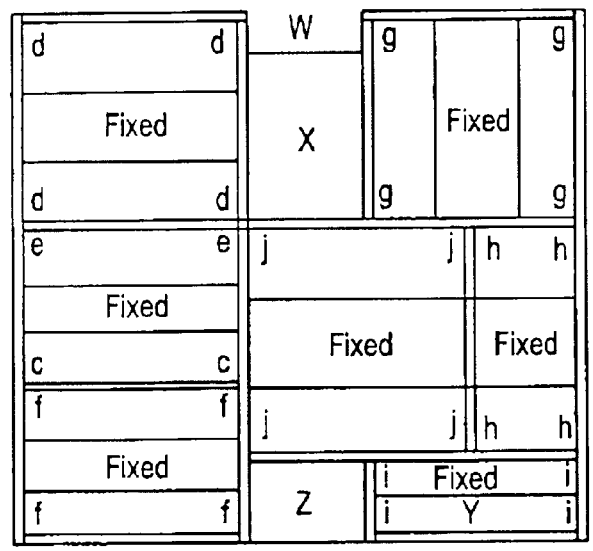
FIG. 6 illustrates the top view of the roof of a large building with variation in the placement of the thermal control means of this invention to conform to architectural features in the design of said building.

Within the context and embodiments of this invention is the provision and distribution of controlled temperature zones within a large structure having a roof assembly of separately mounted and disposed adjacent units. Thus, FIG. 6 illustrates an assembly of seven of my novel thermal control units of various sizes and orientation. The extent of roof coverage by each unit is indicated with like lettering such as d, d, d, d and e, e, e, e to i, i, i, i.

Each unit consists of a panel, preferably of rigid insulation, supported by structural members of said enclosure (not shown) so as to be freestanding over a portion of the roof and here labeled "Fixed." Two colateral panels of rigid movable insulation have a drive means (not shown) that can position them under said "fixed" panels or to partially or completely cover one or more Thermoponds that partly or totally cover the roof of the underlying enclosure.

Figure 7:
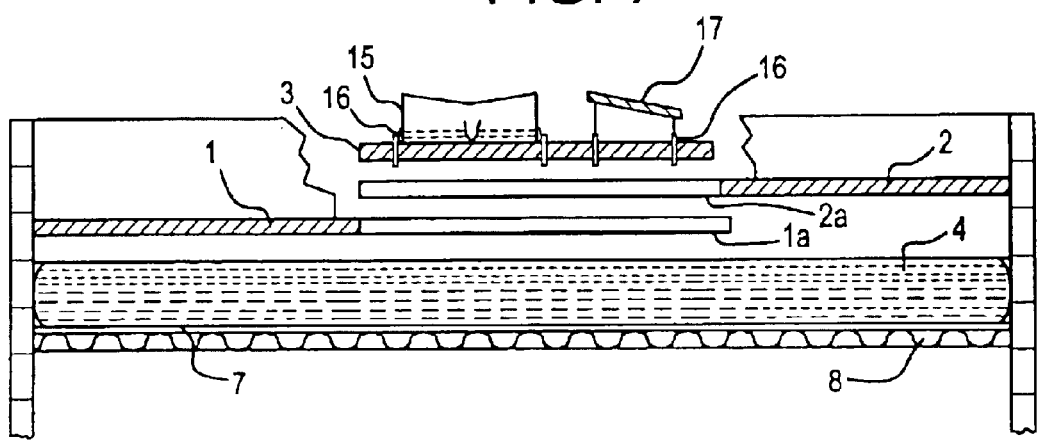
FIG. 7 illustrates an apparatus that uses the fixed panel of my thermal control means to free-span a portion of the roof and to provide a base on which to fasten a variety of devices normally mounted on a roof in a manner that penetrates the moisture barrier thereof.

The units, with respect to the perimeter of the enclosure and the ground, may be oriented to permit easy access to the "fixed" portions by ladder, "cherry-picker", or other means. This is convenient for maintenance of the units and of devices such as solar stills, solar water heaters, satellite dishes, PV arrays and other devices mounted on said "fixed" panels. FIG. 7 shows a cross section of a solar still 15, of my V-Cover type, that is fastened by brackets 16 to an upper metal cladding, framing, or surface forming part of fixed panel 3. Fastening may also use rigid framing of the panels. Likewise shown is a cross section of an array of photovoltaic cells 17 fastened to 3 by bolts, screws, rivets, welding, or other means 16.

As an alternative for access, a walkway (not shown) may be provided on the roof between the parapet and means supporting the tracks in which the movable panels are positioned. More, generally, the size, shape, and orientation of the units conform to the desire for zone control of temperatures in underlying partitioned space in the enclosure.

The size and orientation of the units may also be varied to conform to architectural features of the enclosure. As shown in FIG. 6, units may not cover an entrance W, an atrium X, or a car parking or storage area Z. At location Y, the single, unilateral movable insulation panel is positioned, by a drive mechanism (not shown), so as to be under the "fixed" panel or over all or part of a roof-penetrating skylight (shown covered) for the combination of thermal and daylight control in said underlying enclosure.

While the embodiments of the invention illustrated by FIGS. 1 through 6 have been described with some particularity and other embodiments have also been generally referred to, it is expressly understood that the invention is not restricted thereto, as the essence of the disclosed invention is capable of receiving a variety of expressions which will readily suggest themselves to those skilled in the art. Obviously, changes may be made in the arrangement, proportion and composition of parts and certain features may be used with other features without departing from the spirit of this invention. I do not wish, therefore, to be limited to the precise details of construction and operation set forth but desire to avail myself of all aspects within the scope of the appended claims.

As many materials and methods used in the present invention are common in nature with prior art mentioned in my cited patents, the identity and description of those commonalties in these patents can be used in the embodiments of this invention.

As such, an invention has been disclosed in terms of preferred embodiments thereof which fulfills each and every one of the objects of the present invention as set forth above and provides a new and improved process and apparatus for modulating temperatures in thermal storage.

I claim:

1. In an enclosure having a roof, thermal storage means located above the roof, and movable panels over the thermal storage means for solar energy collection or dissipation of heat, the improvement comprising a temperature modulating assembly, the assembly further comprising:
   a fixed panel positioned above or adjacent the thermal storage means; and
   at least a pair of movable panels, each positioned at different levels with respect to the fixed panel, each movable panel capable of covering and exposing thermal storage means on a side of the fixed panel, wherein portions or all of the movable panels are positioned beneath the fixed panel when covering or exposing the thermal storage means.

2. The improvement of claim 1, wherein the enclosure includes a plurality of the temperature modulating assemblies.

3. The improvement of claim 1, wherein the fixed panel supports one or more of a solar still, a water heater, an antenna, photovoltaic cells, wiring, lightning rods, or combinations thereof.

4. The improvement of claim 1, wherein the fixed panel is positioned over the thermal storage means.

5. The improvement of claim 1, wherein the fixed panel is positioned adjacent the thermal storage means.

6. The improvement of claim 5, wherein an area in the enclosure beneath the fixed panel is separate from another area in the enclosure beneath the thermal storage means.

7. The improvement of claim 6, wherein at least one air moving device is positioned between the area and other area for temperature modulation between the areas.

8. The improvement of claim 1, wherein the enclosure includes a first area with the thermal storage means and the temperature modulating assembly and a second area without the thermal storage means and the temperature modulating assembly.

9. In a method of modulating the temperature in an enclosure having a roof, thermal storage means located above the roof, and movable panels over the thermal storage means for solar energy collection or radiation of heat, wherein the movable panels are positioned for heating and cooling purposes, the improvement comprising:

providing a fixed panel positioned over or adjacent a thermal storage area, and at least two other panels movable with respect to the fixed panel; and positioning one or both of the two other panels beneath a portion or all of the fixed panel for solar energy collection or heat dissipation.

10. The method of claim 9, wherein the fixed panel supports one or more of a solar still, a water heater, an antenna, photovoltaic cells, wiring, lightning rods, or combinations thereof.

11. The method of claim 9, wherein the fixed panel is positioned over the thermal storage means.

12. The method of claim 9, wherein the fixed panel is positioned adjacent the thermal storage means.

13. The method of claim 12, wherein area in the enclosure beneath the fixed panel is separate from area beneath the thermal storage means.

14. The method of claim 13, further comprising moving air between the areas for temperature modulation between the areas.

* * * * *